April 28, 1925.

G. D. ANGLE 1,535,084

MANIFOLD ARRANGEMENT FOR MULTIPLE CYLINDER ENGINES

Filed Dec. 30, 1920    2 Sheets-Sheet 1

April 28, 1925. 1,535,084
G. D. ANGLE
MANIFOLD ARRANGEMENT FOR MULTIPLE CYLINDER ENGINES
Filed Dec. 30, 1920 2 Sheets-Sheet 2
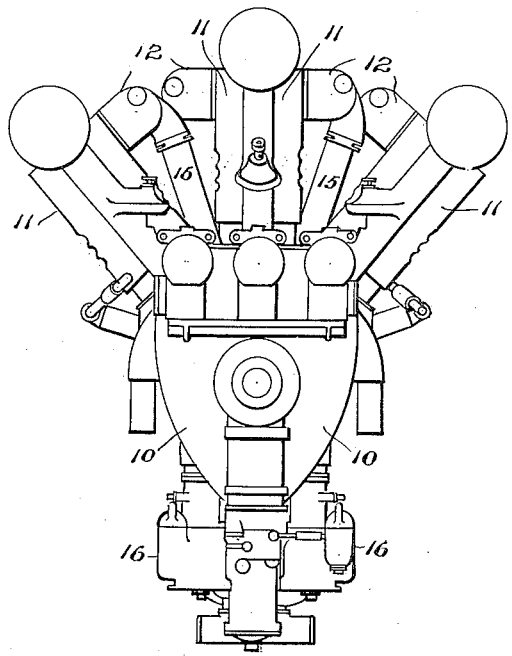

Patented Apr. 28, 1925.

1,535,084

UNITED STATES PATENT OFFICE.

GLENN D. ANGLE, OF DETROIT, MICHIGAN.

MANIFOLD ARRANGEMENT FOR MULTIPLE-CYLINDER ENGINES.

Application filed December 30, 1920. Serial No. 434,135.

*To all whom it may concern:*

Be it known that I, GLENN D. ANGLE, a citizen of the United States, residing at Detroit, in the county of Wayne and State of Michigan, have invented certain new and useful Improvements in Manifold Arrangements for Multiple-Cylinder Engines, of which the following is a specification.

This invention relates to a manifold arrangement for multiple cylinder engines, the main object in view being to provide in conjunction with an internal combustion engine having a plurality of batteries of cylinders, a compact arrangement of manifold units so positioned with respect to each other and the cylinders as to avoid any projection upon the outside of the batteries of cylinders. By means of the arrangement herein fully described and shown, the lateral dimensions of the engine are not increased. Furthermore, each intake manifold unit is the exact counterpart of each and all of the remaining intake manifold units, enabling any manifold unit to be placed at any position in the engine with respect to a group of cylinders. This simplifies the manifold arrangement and cheapens the cost of production.

With the above and other objects in view the invention consists in the novel construction, combination and arrangement herein fully described, illustrated and claimed.

In the accompanying drawings—

Figure 2 is an end elevation of the same;

The improved manifold arrangement is particularly adapted to engines of the multiple cylinder type embodying two or more batteries of cylinders arranged in V formation or W formation, the drawings illustrating an engine having cylinders arranged in W formation.

Figure 1:
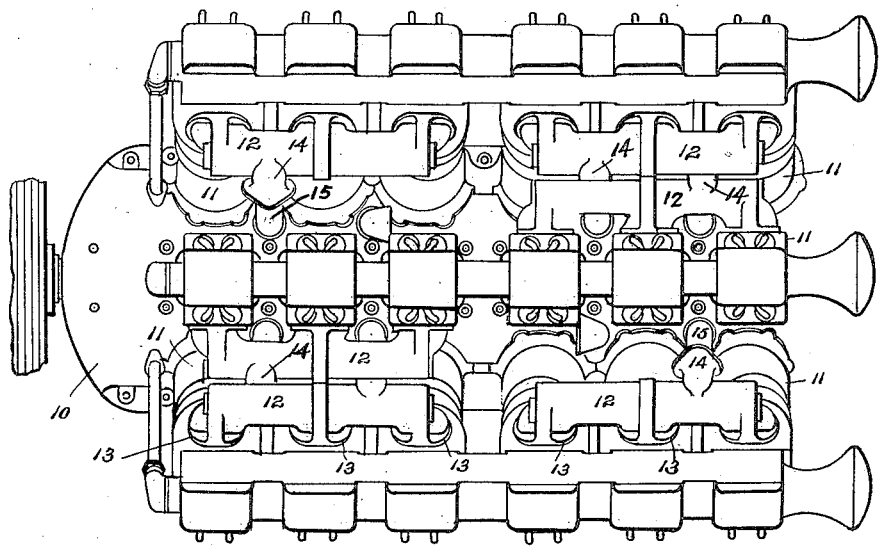
Figure 1 is a plan view of a multiple cylinder internal combustion engine showing the improved manifold arrangement.

The crank case 10 of the engine is shown as having three batteries of cylinders mounted thereon and fastened thereto, said cylinders being indicated at 11. By reference to Figure 1 it will be observed that for the convenience of manufacture the cylinders may be said to be arranged in groups of three. The engine is shown as comprising eighteen cylinders, there being three batteries of cylinders, each battery containing six cylinders and each battery being composed of two sets or groups of cylinders, there being three cylinders to each set or group.

Figure 3:
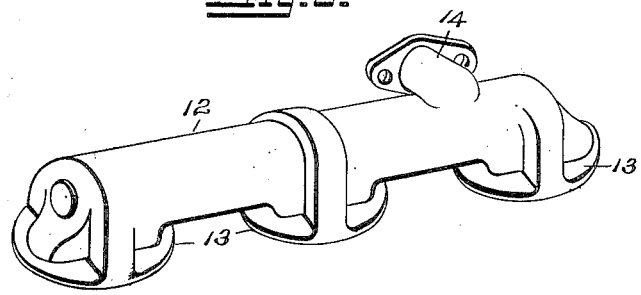
Figure 3 is a perspective view of one of the intake manifold units.

In conjunction with each group of three cylinders, it is preferred to employ an intake manifold unit, one of the units being illustrated detached in Figure 3 of the drawings. Each manifold unit is of tubular formation throughout, comprising the main tubular body portion 12 having three outlet port extensions 13 for connection with corresponding ports of the engine cylinders, and having also a single inlet port extension nozzle or elbow 14 to which is fastened the respective intake or induction pipe 15. In the improved engine the induction pipe 15 extends downwardly through the crank case, as shown and described in a co-pending application, and has a carburetor 16 attached to the lower end thereof. The annular disposition of the elbow 14 in relation to its manifold unit is such as to enable said unit to be applied to any group of cylinders whether it be one of the outside groups or an intermediate group. The elbow 14 is offset to one side of the center of the body of the intake manifold unit and this offset feature taken in connection with the angular disposition of the elbow 14 renders the unit applicable to any one of the groups of cylinders. Thus only one intake manifold unit casting is necessary to complete the entire intake manifold equipment of the engine. It will be obvious that this greatly simplifies manufacture and is conducive to quantity production.

While I have shown the improved manifold arrangement applied to a multiple cylinder engine having three batteries of cylinders, it will, of course, be obvious that the invention is equally applicable to engines having two or more batteries of cylinders irrespective of the number of cylinders used in each battery and irrespective of the particular grouping of the cylinders or, in other words, the number of cylinders in each group. I do not, therefore, desire to be restricted to the exact arrangement shown and described, it being apparent that the number and arrangement of the groups, batteries and cylinders may be varied without departing from the spirit or sacrificing the advantages of the invention.

I claim:

The combination, in a W-type engine, of a plurality of pipes for the fuel mixture passing through the crank case, and up between the center and outer banks of cylinders, of an intake manifold unit, comprising a body portion provided with a plurality of flanged openings therealong, the flanges of which are in substantially the same plane, said unit further comprising an intake pipe near one end of the unit, the intake pipe entering the manifold so that the axial lines of one of the first mentioned set of openings, and of the intake pipe, are at an acute angle, whereby the intake manifold unit will fit in position on any one of the three banks of cylinders; with the intake pipe thereof fitting onto one of the first mentioned fuel mixture pipes between the cylinders.

In testimony whereof I have affixed my signature.

GLENN D. ANGLE.